United States Patent [19]
Zander et al.

[11] Patent Number: 5,296,886
[45] Date of Patent: Mar. 22, 1994

[54] FILM CASSETTE WITH SPOOL LOCK

[75] Inventors: Dennis R. Zander, Penfield, N.Y.; Hideaki Kataoka, Odawara, Japan

[73] Assignees: Eastman Kodak Company, Rochester, N.Y.; Fuji Photo Film Co., Ltd., Tokyo, Japan

[21] Appl. No.: 34,037

[22] Filed: Mar. 22, 1993

[51] Int. Cl.⁵ .............................................. G03B 17/26
[52] U.S. Cl. .................................... 354/275; 242/71.1
[58] Field of Search .............. 354/275, 276, 277, 281; 242/71, 71.1

[56] References Cited

U.S. PATENT DOCUMENTS

| | | | |
|---|---|---|---|
| 2,731,894 | 1/1956 | Leitz et al. | 354/275 |
| 4,221,479 | 9/1980 | Harvey | 354/275 |
| 4,225,034 | 3/1981 | Harvey et al. | 354/121 |
| 4,938,429 | 7/1990 | Robertson et al. | 242/71.1 |
| 4,962,401 | 10/1990 | Takahashi | 354/275 |
| 5,030,978 | 7/1991 | Stoneham et al. | 354/21 |
| 5,049,912 | 9/1991 | Pagano et al. | 354/275 |
| 5,115,268 | 5/1992 | Kitagawa et al. | 354/275 |
| 5,200,777 | 4/1993 | Zander | 354/275 |

FOREIGN PATENT DOCUMENTS

| | | | |
|---|---|---|---|
| 0414269A2 | 2/1991 | European Pat. Off. | G03B 17/30 |
| 0436767A2 | 7/1991 | European Pat. Off. | G03B 17/30 |
| 2-64533 | 3/1990 | Japan | G03B 17/30 |
| 3-75637 | 3/1991 | Japan | G03C 3/00 |

Primary Examiner—M. L. Gellner
Assistant Examiner—Howard B. Blankenship
Attorney, Agent, or Firm—Roger A. Fields

[57] ABSTRACT

A film cassette adapted to be opened and closed comprises a film spool supported for rotation, and a lock for inhibiting rotation of the film spool when the cassette is closed and allowing the film spool to rotate when the cassette is opened. According to the invention, a retainer keeps the lock in place to make it inhibit rotation of the film spool when the cassette is opened, but allows the film spool to be initially forcibly rotated to move the lock out of place to then allow the film spool to be freely rotated. Thus, the film spool must be rotated to discontinue the affect of the lock after the cassette is opened.

10 Claims, 3 Drawing Sheets

FILM CASSETTE WITH SPOOL LOCK

CROSS-REFERENCE TO RELATED APPLICATIONS

Reference is made to commonly assigned copending applications Ser. No. 07/787356, U.S. Pat. No. 5,200,777, entitled FILM CASSETTE WITH INTEGRATED CASSETTE ELEMENT LOCK AND LIGHT BLOCKING DEVICE and filed Nov. 4, 1991 in the name of Dennis R. Zander, Ser. No. 08/036,020, entitled FILM CASSETTE WITH SPOOL LOCK AND LIGHT-SHIELDING DOOR and filed Mar. 22, 1993 in the names of Dennis R. Zander and Eugene Sisto, and Ser. No. 08/034/978, entitled FILM CASSETTE WITH SPOOL LOCK AND LIGHT-SHIELDING DOOR and filed Mar. 22, 1993 in the names of Dennis R. Zander and Hideaki Kataoka.

BACKGROUND OF THE INVENTION

1. Field of the Invention

The invention relates generally to the field of photography, and in particular to a film cassette containing a film spool about which a filmstrip is coiled. More specifically, the invention relates to a film cassette having a spool lock for preventing unintended rotation of the film spool.

2. Description of the Prior Art

Film cassettes provided with a spool lock for preventing unintended rotation of a film spool inside the cassette are generally known.

For example, U.S. Pat. No. 4,221,479 issued Sep. 9, 1980 discloses a film cassette adapted to be opened and closed comprising a film spool supported for rotation, and movable locking means for inhibiting rotation of the film spool when the cassette is closed and allowing the film spool to rotate when the cassette is opened. The film cassette has a pair of collar halves at each end of the cassette with respective polygon-shaped bearing halves for receiving polygon-shaped journals at opposite ends of the film spool. When the film cassette is closed, rotation of film spool is inhibited because of the contact between the bearing halves and the journals. Conversely, when the film cassette is opened, the film spool is free to rotate because bearing halves have been moved away from the journals.

According to another example, U.S. Pat. No. 5,115,268 issued May 19, 1992 discloses a film cassette comprising a light-trapping plush for preventing ambient light from entering the cassette interior through a film egress/ingress passageway, a film spool supported for rotation in film unwinding and film winding directions, and a locking pawl supported for movement into engagement with the film spool to secure the spool and out of engagement with the spool to release the spool. The film spool has a coaxial ratchet wheel with asymmetrically shaped teeth. The locking pawl appears to be a rigid beam member which is pivotally mounted at one end and has an asymmetrically shaped detent portion at an opposite end. A curved spring arm portion of the locking pawl extends from the end of the rigid beam member that has the detent portion, to bias the detent portion to between any two adjacent ones of the teeth in order to secure the film spool. To remove the detent portion from between two adjacent ones of the teeth, an engagement release portion of the locking pawl is turned to pivot the rigid beam member against the contrary urging of the spring arm portion. The engagement release portion then is held in the turned-to position to maintain the detent portion separated from the ratchet wheel. When the engagement release portion is released, the spring arm portion is free to pivot the rigid beam member to return the detent portion to between any two adjacent ones of the teeth in order to re-secure the spool.

PROBLEMS TO BE SOLVED BY THE INVENTION

U.S. Pat. No. 4,221,479 teaches that the film spool be made freely rotatable responsive to opening the film cassette. Consequently, when the cassette is opened the tendency of the filmstrip coiled about the film spool to possibly expand or contract as a film roll may cause the spool to be rotated to an undesired orientation.

Similarly, in U.S. Pat. No. 5,115,268, when the locking pawl is pivoted out of engagement with the film spool the tendency of the filmstrip coiled about the spool to possibly expand or contract as a film roll may cause the leading end of the film leader to be advanced or retracted to an undesired position.

SUMMARY OF THE INVENTION

According to the invention, the spool lock is "disabled", for example when the film cassette is opened, that is the spool lock continues to apply a locking bias to the film spool, although it allows the film spool to be forcibly rotated. Then if the film spool is forcibly rotated, the affect of the spool lock is discontinued; whereupon, the film spool can be freely rotated. Thus, the film spool must be rotated to completely unlock it.

More specifically, there is provided a film cassette adapted to be opened and closed which comprises a film spool supported for rotation, and movable locking means for inhibiting rotation of the film spool when the cassette is closed and for allowing the film spool to rotate when the cassette is opened, and which is characterized in that:

retaining means keeps the movable locking means in place to make it inhibit rotation of the film spool when the cassette is opened, but allows the film spool to be initially forcibly rotated to move the locking means out of place to then allow the film spool to be freely rotated, whereby the film spool must be rotated to discontinue the affect of the locking means after the cassette is opened.

ADVANTAGEOUS EFFECT OF THE INVENTION

By requiring the film spool to be rotated to discontinue the affect of the locking means (as opposed to unlocking the spool before it is rotated), the problems attendant with U.S. Pat. No. 4,221,479 and U.S. Pat. No. 5,115,268 are believed to be solved.

DETAILED DESCRIPTION OF THE INVENTION

The invention is disclosed as being embodied preferably in a film cassette. Because the features of a film cassette are generally known, the description which follows is directed in particular only to those elements forming part of or cooperating directly with the disclosed embodiment. It is to be understood, however, that other elements may take various forms known to a person of ordinary skill in the art.

Figure 1:
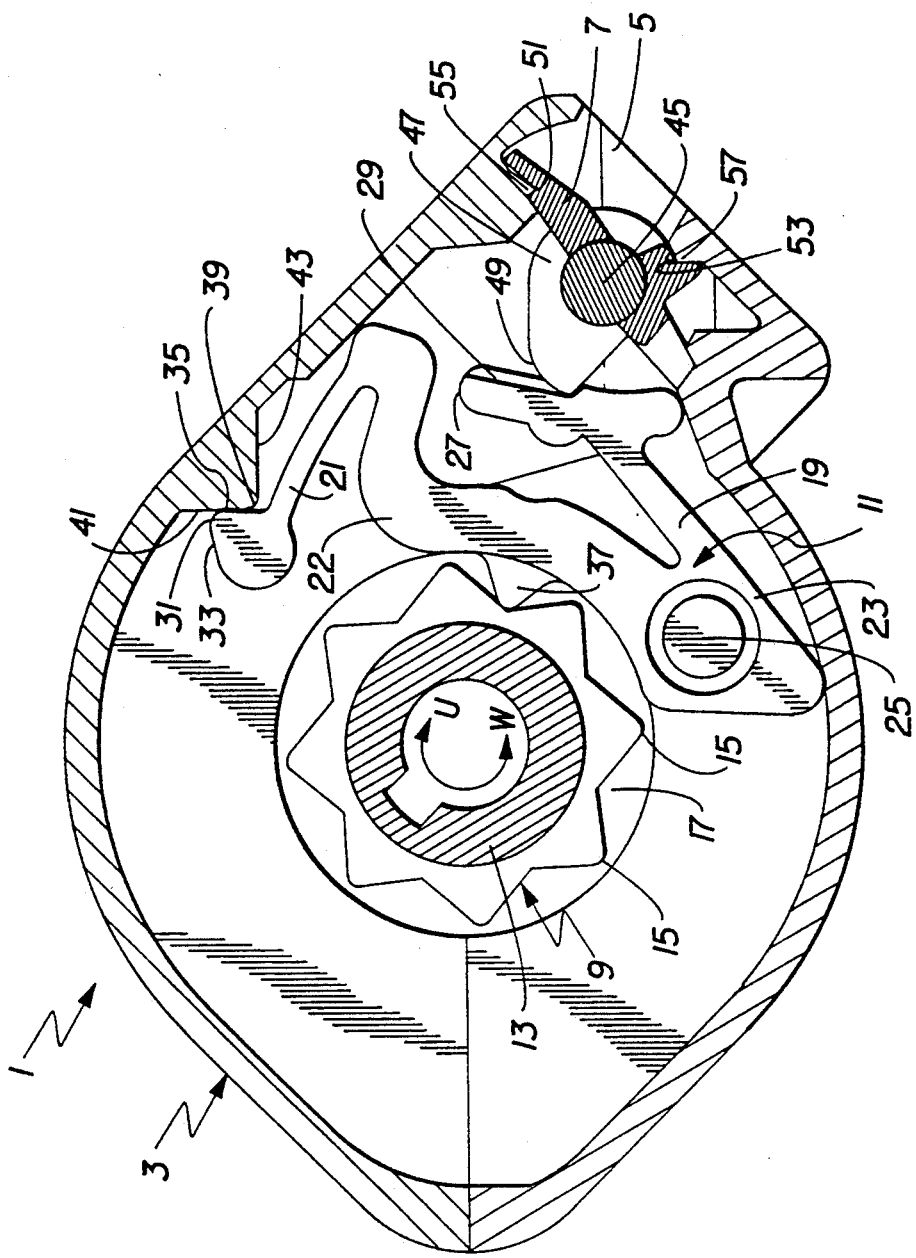
FIG. 1 is a sectional view of a film cassette with a spool lock and a light-shielding door according to a preferred embodiment of the invention, showing the door closed and the spool lock in a locking position.
Figure 2:
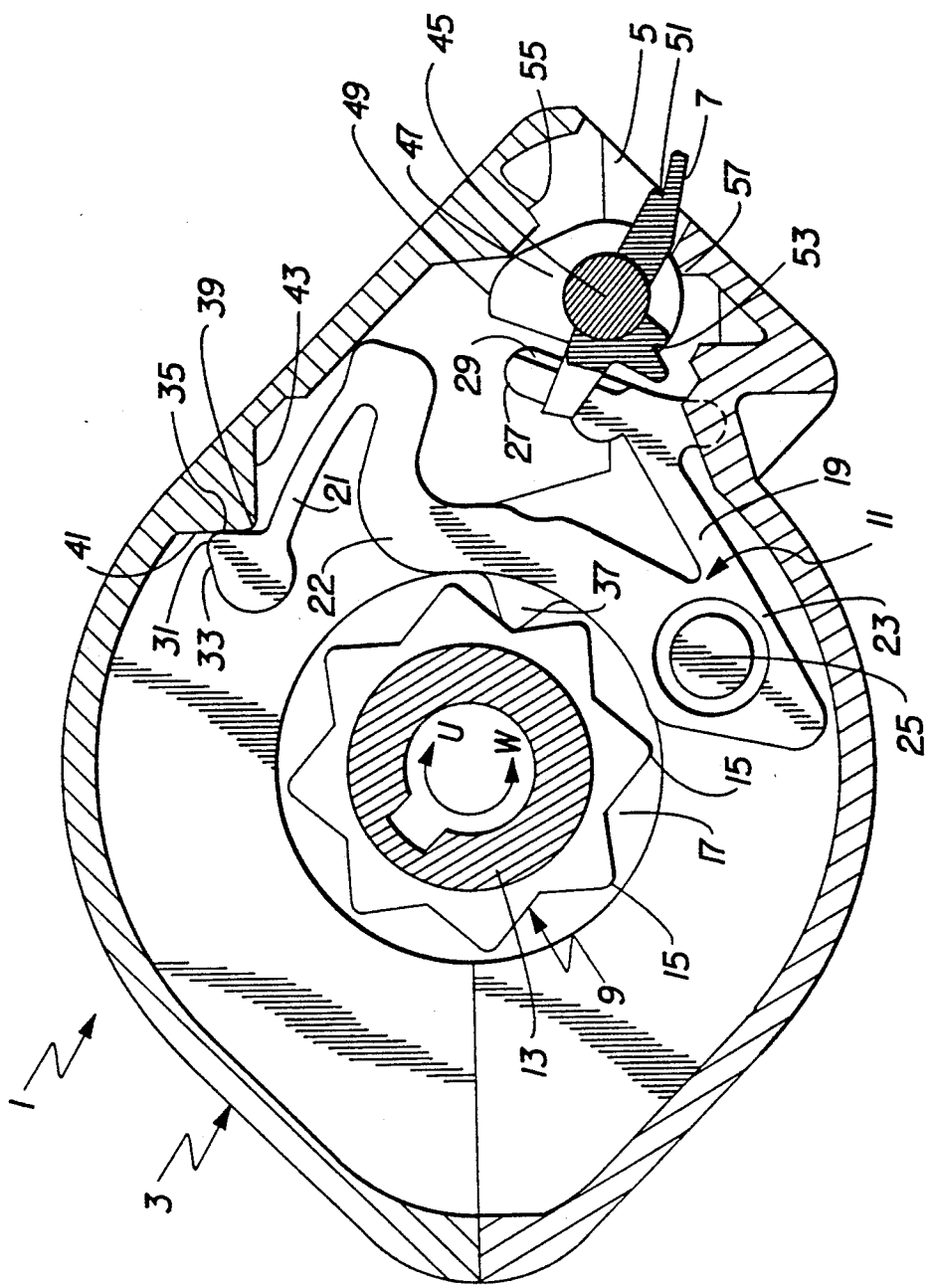
FIG. 2 is a sectional view similar to FIG. 1, showing the door open and the spool lock in its locking position.
Figure 3:
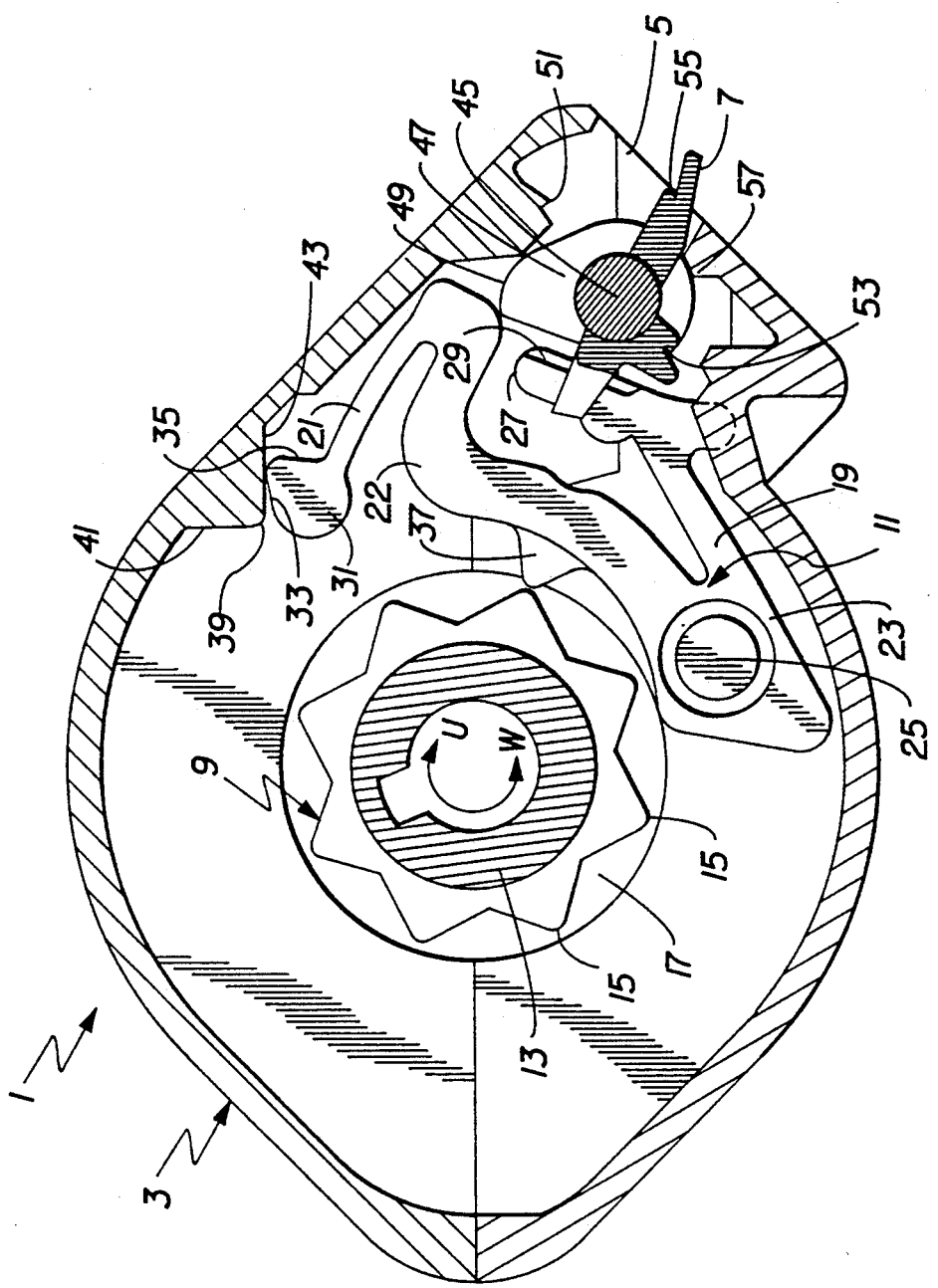
FIG. 3 is a sectional view similar to FIG. 1, showing the door open and the spool lock in a non-locking position.

Referring now to the drawings, FIGS. 1-3 show a film cassette 1 comprising a cassette shell or housing 3 with a film egress/ingress opening 5, a light-shielding door 7 for preventing ambient light from entering the cassette interior through the film egress/ingress opening, a film spool 9 supported for rotation inside the cassette shell in film unwinding and winding directions U and W, and a locking device 11 for securing or arresting the spool to prevent its rotation. Certain aspects of the film cassette 1 are similar to cross-referenced application Ser. No. 07/787356. The cross-referenced application is incorporated in this application.

The film spool 9 has a spool core or hub 13 with a toothed periphery consisting of successive teeth 15 separated by respective interdental spaces 17. The teeth 15 are each identically symmetrically ( not asymmetrically) shaped. See FIG. 1.

The locking device 11 is a single-piece device comprising a first spring arm 19, second spring arm 21 more compliant than the first spring arm, and a relatively stiff support-extension 22 of the second spring arm. The first spring arm 19 and the relatively stiff support-extension 22 of the second spring arm 21 generally converge to a common base 23. The locking device 11 is supported for pivotal movement at the base 23 about an axis pin 25 or a ball-and socket (not shown). Each of the two spring arms 19 and 21 is capable of recovering its size and shape after deformation caused by compressive stress. The first spring arm 19 has a free end 27 and a cam follower surface 29 located between the free end and the base 23. The second spring arm 21 has a free end 31 with two angled sides 33 and 35, and its relatively stiff support-extension 22 has a symmetrically shaped detent portion 37 located between the free end and the base 23.

A restraining protuberance 39 with two angled sides 41 and 43 is fixed to the inside of the cassette shell 3. As shown in FIGS. 1 and 2, the angled side 41 of the restraining protuberance 39 is adapted to captively contact the angled side 35 of the free end 31 of the second spring leg 21 to hold the detent portion 37 of the relatively stiff support-extension 22 in anyone of the interdental spaces 17 between two adjacent ones of the teeth 15. This is done to secure or arrest the spool core 13 substantially to prevent rotation of the film spool 9 in the film unwinding and winding directions U and W. However, as shown in FIG. 3, the film spool 9 can be forcibly rotated in the film unwinding and winding directions U and W to make either one of the two adjacent teeth 15 between which the detent portion 37 is positioned eject the detent portion from the particular space 17 separating those two teeth.

The light-shielding door 7 is supported for closing movement about an axis pin 45 to prevent ambient light from entering the cassette interior through the film egress/ingress opening 5 and for opening movement about the same pin to permit film movement out of and back into the cassette interior. The axis pin 45 for the door 7 extends parallel to the axis pin 25 for the locking device 11. A coaxial cam 47 is integrally formed with the door 7 and has a camming surface 49 for depressing the cam follower surface 29 of the first spring leg 19, when the door is closed, to pivotally move the locking device 11 as can be seen by looking at FIGS. 3 and 1. This normally causes the free end 31 of the second spring leg 21 to hop over the restraining protuberance 39, consequently separating the angled side 33 of the free end from the angled side 43 of the restraining protuberance, and bringing the angled side 35 of the free end into captive contact with the angled side 41 of the restraining protuberance. At the same time, the detent portion 37 of the relatively stiff support-extension 22 will be positioned in anyone of the interdental spaces 17 between two adjacent ones of the teeth 15.

Respective notches 51 and 53 are provided in the light-shielding door 7 for receiving mating projections 55 and 57 fixed to the inside of the cassette shell, when the door is closed as shown in FIG. 1, to releaseably secure the door closed. Pushing the door 7 open overcomes the notch-and-projection engagement. Alternatively, other detent means may be provided.

OPERATION

Beginning with FIGS. 1 and 2, when the light-shielding door 7 is opened, its camming surface 49 is removed from the cam follower surface 29 of the first spring leg 19. However, the second spring leg 21 continues to hold the detent portion 37 of the relatively stiff support-extension 22 in anyone of the interdental spaces 17 between two adjacent ones of the teeth 15 because the angled side 35 of the free end 31 of the second spring leg is in captive contact with the angled side 41 of the restraining protuberance 39. Thus, the locking device 11 remains in place as shown in FIG. 2.

Rotation of the film spool 9 in the unwinding direction U, then, as shown in FIG. 3, causes one of the two teeth 15 between which the detent portion 37 of the relatively stiff support-extension 22 is positioned to eject the detent portion from the particular space 17 separating those two teeth. Concurrently, the free end 31 of the second spring leg 21 hops over the restraining protuberance 39, consequently separating the angled side 35 of the free end from the angled side 41 of the restraining protuberance, and bringing the angled side 33 of the free end into captive contact with the angled side 43 of the restraining protuberance. Thus, the locking device 11 is pivotally moved as can be seen by looking at FIGS. 2 and 3.

If the film spool 9 is rotated in the unwinding direction U, but the door 7 is closed, one of the two adjacent teeth 15 between which the detent portion 37 of the relatively stiff support-extension 22 is positioned will eject the detent portion from the particular space 17 separating those two teeth. (This is possible due to the compliance of the first spring leg 19.) Concurrently, the free end 31 of the second spring leg 21 hops over the restraining protuberance 39, consequently separating the angled side 35 of the free end from the angled side 41 of the restraining protuberance, and bringing the angled side 33 of the free end into captive contact with the angled side 43 of the restraining protuberance. However, the locking device 11 is not free to be pivoted as in FIG. 3, when the door 7 is opened, because the camming surface 49 of the door will continue to bear against the cam follower surface 29 of the first spring leg 19. Then, the resilience of the first spring leg 19 will return the detent portion 37 of the relatively stiff support-extension 22 to the next available space 17 as the film spool 9 is continued to be rotated, and cause the free end 31 of the second spring leg 21 to return over the restraining protuberance 39. As a result, the locking device 11 is not fractured, nor is the door 7 compelled to be opened.

When the door 7 is closed, its camming surface 49 depresses the cam follower surface 29 of the first spring leg 19 to pivotally move the locking device 11 as can be seen by looking at FIGS. 3 and 1. This normally causes the free end 31 of the second spring leg 21 to hop over the restraining protuberance 39, consequently separating the angled side 33 of the free end from the angled side 43 of the restraining protuberance, and bringing the angled side 35 of the free end into captive contact with the angled side 41 of the restraining protuberance. At the same time, the detent portion 37 of the relatively stiff support-extension 22 is positioned in anyone of the spaces 17 between two adjacent ones of the teeth 15.

If the door 7 is closed, but the tip of the detent portion 37 of the relatively stiff support-extension 22 abuts the tip of one of the teeth 15, the free end 31 of the second spring leg 21 cannot hop over the restraining protuberance 39. Thus, the locking device 11 will not be pivoted as in FIG. 1. However, the door 7 can still be forced closed without fracturing the locking device 11 due to the compliance of its first spring leg 19. Then, rotation of the film spool 9 in the winding direction W will allow the detent portion 37 of the relatively stiff support-extension 22 to be received in one of the spaces 17. At the same time, the free end 31 of the second spring leg 21 hops over the restraining protuberance 39, consequently separating the angled side 33 of the free end from the angled side 43 of the restraining protuberance, and bringing the angled side 35 of the free end into captive contact with the angled side 41 of the restraining protuberance. Thus, the locking device 11 will be pivoted as can be seen by looking at FIGS. 3 and 1.

The invention has been described with reference to a preferred embodiment. However, it will be appreciated that variations and modifications can be effected by a person of ordinary skill in the art without departing from the scope of the invention.

Parts List for FIGS. 1–3

1. film cassette
3. cassette shell
5. film egress/ingress opening
7. light-shielding door
9. film spool
11. locking device
13. spool core
15. teeth
17. interdental spaces
19. first spring arm
21. second spring arm
22. relatively stiff support-extension
23. base for spring arms
25. axis pin
27. free end of first spring arm
29. cam follower surface
31. free end of second spring arm
33. angled side of free end 31
35. angled side of free end 31
37. detent portion
39. restraining protuberance
41. angled side of restraining protuberance
43. angled side of restraining protuberance
45. axis pin
47. coaxial cam
49. camming surface
51. notch in door
53. notch in door
55. projection from cassette shell
57. projection from cassette shell
U. film unwinding direction
W. film winding direction

We claim:

1. A film cassette adapted to be opened and closed comprising a film spool supported for rotation, and movable locking means for inhibiting rotation of said film spool when said cassette is closed and allowing the film spool to rotate when the cassette is opened, is characterized in that:

retaining means keeps said movable locking means in place to make it inhibit rotation of said film spool when said cassette is opened, but allows the film spool to be initially forcibly rotated to move the locking means out of place to then allow the film spool to be freely rotated, whereby the film spool must be rotated to discontinue the affect of the locking means after the cassette is opened.

2. A film cassette as recited in claim 1, wherein said locking means includes a symmetrically shaped detent for engaging said film spool, and said film spool is rotatable in film unwinding and film winding directions and has a toothed periphery with respective successive teeth that are symmetrically shaped to receive said detent between any two adjacent ones of said teeth and to eject the detent from between those two teeth to move said locking means out of place when said film spool is initially forcibly rotated in the film unwinding and film winding directions.

3. A film cassette as recited in claim 1, wherein light-shielding means opens and closes to open and close said cassette.

4. A film cassette as recited in claim 3, wherein said light-shielding means includes cam means for moving said locking means into place to inhibit rotation of said film spool when the locking means is closed and for being retracted from the locking means when the light-shielding means is opened.

5. A film cassette comprising a film spool supported for rotation, a spool lock supported for movement into engagement with said film spool to secure the film spool and out of engagement with the film spool, and actuation means for moving said spool lock into engagement with said film spool and holding the spool lock engaged with the film spool, is characterized in that:

said actuation means is retractable from said spool lock to release the spool lock from being held engaged with said film spool to permit the spool lock to be disengaged from the film spool;

said film spool includes integral means for disengaging said spool lock from the film spool responsive to rotation of the film spool when said actuation means has released the spool lock; and retaining means holds said spool lock engaged with said film spool even though said actuation means has released the spool lock, but allows the spool lock to be disengaged from the film spool responsive to rotation of the film spool.

6. A film cassette as recited in claim 5, wherein said spool lock includes a symmetrically shaped detent for engaging said film spool, said film spool is rotatable in film unwinding and film winding directions, and said integral means of said film spool is a toothed periphery with respective successive teeth that are symmetrically shaped to receive said detent between any two adjacent ones of said teeth and to eject the detent from between those two teeth when said film spool is rotated in the film unwinding and film winding directions.

7. A film cassette as recited in claim 5, wherein said actuation means includes light-shielding means which closes to prevent ambient light from entering the cassette interior when the actuation means moves said spool lock into engagement with said film spool and which opens when the actuation means releases the spool lock.

8. A film cassette as recited in claim 5, wherein said retaining means includes integral means for releasing said spool lock from being held engaged with said film spool when the film spool is rotated.

9. A film cassette as recited in claim 5, wherein said retaining means includes respective cooperating means fixed to the inside of the cassette and to said spool lock for releasing the spool lock from being held engaged with said film spool when the film spool is rotated, for holding the spool lock disengaged from the film spool, and for releasing the spool lock from being held disengaged from the spool lock when said actuation means moves the spool lock into engagement with the film spool.

10. A film cassette as recited in claim 9, wherein at least one of said cooperating means fixed to the inside of the cassette and to said spool lock is resilient to permit it to be temporarily deformed to release the spool lock from being held engaged with said film spool and from being held disengaged from the film spool.

* * * * *